United States Patent [19]
Merkel et al.

[11] Patent Number: 5,766,771
[45] Date of Patent: Jun. 16, 1998

[54] ELASTOMERS HAVING A FRICTION-REDUCING COATING

[75] Inventors: Wilfried Merkel, Kappelrodeck; Wolfgang Leutsch, Buehlertal; Volker Gerhard, Saarbruecken; Frank Gross, Saarbruecken; Helmut Schmidt, Saarbruecken, all of Germany

[73] Assignee: Robert Bosch GmbH, Stuttgart, Germany

[21] Appl. No.: 732,301
[22] PCT Filed: Feb. 24, 1996
[86] PCT No.: PCT/DE96/00312
 § 371 Date: Oct. 28, 1996
 § 102(e) Date: Oct. 28, 1996
[87] PCT Pub. No.: WO96/26972
 PCT Pub. Date: Sep. 6, 1996

[30] Foreign Application Priority Data

Mar. 1, 1995 [DE] Germany .................. 195 06 851.3
Dec. 18, 1995 [DE] Germany .................. 195 47 088.5

[51] Int. Cl.$^6$ ........................................... B05D 5/08
[52] U.S. Cl. ............... 428/447; 428/451; 428/492; 427/387; 427/412.1
[58] Field of Search ................... 427/387, 412.1; 428/447, 451, 492

[56] References Cited

FOREIGN PATENT DOCUMENTS

| 467406 | 1/1992 | European Pat. Off. |
| 62-112647 | 5/1987 | Japan . |
| 62-212442 | 9/1987 | Japan . |

*Primary Examiner*—Erma Cameron
*Attorney, Agent, or Firm*—Spencer & Frank

[57] ABSTRACT

A method of producing a layer which is friction-reducing on an elastomeric substrate includes (a) providing an elastomeric substrate; (b) forming a sol by hydrolysis and condensation of at least one silane having a formula:

$$R^1Si(OR')_3 \qquad (I)$$

where $R^1$ is one of a glycidyloxy-functional residue or a mercapto-functional residue and R' is a residue of a lower alkyl group having 1–4 carbon atoms; (c) coating the elastomeric substrate with the sol to form a coating; and (d) curing the coating to form a gel. The method is particularly suited for the coating of rubber surfaces, e.g., wiper blades.

15 Claims, 1 Drawing Sheet

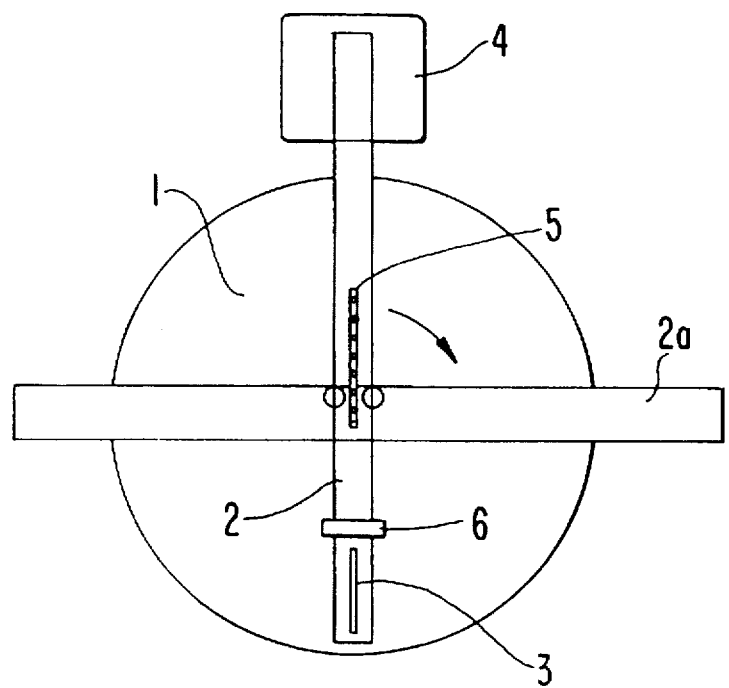

ELASTOMERS HAVING A FRICTION-REDUCING COATING

BACKGROUND OF THE INVENTION

It is known that elastomers are polymer materials with rubber-elastic behavior which at room temperature can be stretched to a multiple of their normal length, with this being practically fully reversible, and which, specifically because of this property, have been used in many different technical applications. In addition to the elastic behavior, the frictional resistance frequently is also a decisive factor which in some applications, e. g., for motor vehicle tires and shoe soles, should be as high as possible but in other applications as low as possible, e. g., as rubber for wipers.

Wiper blades must meet high, partially contrary demands. On the one hand, they must be hard and sturdy enough to withstand the mechanical stresses under the prevailing operating conditions as long as possible without damage. But on the other hand, they must be elastic enough to transmit a contact pressure onto the pane over the entire surface that is wiped, which pressure should be as constant as possible. Furthermore, during wet friction and, in particular, during dry friction, the frictional resistance vis-a-vis glass should be as small as possible so that, on the one hand, the mechanical stress on the wiper is as small as possible and the wiper can be operated with as little energy as possible and, on the other hand, the stick-slip effect is prevented, i. e., uneven rubbing during wiping, especially of the dry pane. It is known that the frictional resistance can be reduced through aftertreatments of the rubber, for example, by dusting on solid substances such as talc or zinc stearate or by a chemical aftertreatment, for example, with a halogen, sulfuric acid or potassium permanganate. Chlorination with elemental chlorine is among the most widely used aftertreatment processes. It is, however, associated with health and safety risks, it is not reproducible to a satisfactory degree, and it is also accompanied by a deterioration of physical and chemical properties, for example, reduced ozone resistance, earlier material fatigue and increased wear.

Furthermore, it is known that the frictional resistance can be reduced or the sliding properties improved in that the surfaces are coated. This process is primarily applied to elastomers in which the chlorination fails, e. g., to ethylene-propylene-diene copolymers. The coating may be comprised of soft formulations of the said copolymers, but it is based to a great extent on fluoroorganic compounds, e. g., polytetrafluorethylene, which distinguishes itself because of excellent sliding characteristics. Perfluorinated polymers, however, adhere very poorly to the substrates so that optionally expensive pretreatments are required to ensure good adhesion. Furthermore, perfluorinated polymers are soft. Therefore, their surface is easily damaged which considerably impairs the functioning of the respective component, e. g., of a wiper blade or a seal.

Nass et al. (Synthesis and Properties of Transparent $ZrO_2$ Containing $SiO_2$ Polymethacrylate Polymers, SPIE Vol. 1328 Sol-Gel Optics [1990], p. 258 et seq.) have described a method wherein a sol generated from 3-methacryloxysilane, zirconium propylate and methacrylic acid is used as coating agent. By way of radical polymerization, a stabilizing organic network is formed in addition to the inorganic skeleton. The zirconium is tied into both. But these inorganic-organic polymers, also identified as ormocers (organically modified ceramics), are relatively brittle and their adhesion on rubber surfaces is not satisfactory. Also, zirconium propylate is a relatively expensive raw material.

ADVANTAGES OF THE INVENTION

The hard-elastic coatings according to the invention considerably reduce the frictional resistance of elastomers vis-a-vis glass for both dry friction and wet friction, they have good adhesion to rubber surfaces, they are highly elastic and sufficiently resistant to abrasion. Therefore, they are eminently suited for the coating of wiper blades made of rubber. The coatings reduce the frictional resistance of non-chlorinated rubber to levels which correspond to those of chlorinated rubber, and they clearly reduce the comparatively low frictional resistance of chlorinated rubber even further. The materials required for the production of the coating according to the invention are inexpensive and often commercially available in industrial amounts. Chemicals which are considered environmentally harmful such as chlorine and chlorinated hydrocarbons are not needed. The process is not expensive and uses conventional technical apparatuses and methods. It is reliable, i. e., accomplishes reproducible results.

SUMMARY OF THE INVENTION

The advantages described were accomplished with a method of producing adherent, hard-elastic and friction-reducing layers on elastomeric substrates, wherein the substrates are coated with a sol which is formed through hydrolysis and condensation of silanes of the formula $R^1Si(OR')_3$ (I) in which $R^1$ is understood to mean a glycidyloxy-functional or mercapto-functional residue and $R'$ a lower alkyl residue, and the coating cures to form a gel.

A silane of the formula $R^2{}_xSi(OR')_{4-x}$ (II) may be incorporated into the production of the sol, in which formula $R^2$ is respectively understood to mean a halogenated higher alkyl residue or a lower alkyl residue, with the proviso that at least one of the residues $R^2$ is a halogenated higher alkyl residue, $R'$ identifies respectively a lower alkyl residue and x stands for a whole number from 1 to 3. In the silane (II), one of the substituents $R^2$ may be a highly fluorinated alkyl residue comprising 5 to 18 carbon atoms and the substituents $R'$ may be lower alkyl residues comprising preferably 1 to 4 carbon atoms.

A silane of the formula $R^3{}_xSi(OR')_{4-x}$ (III) may be incorporated into the production of the sol, in which formula $R^3$ is respectively understood to mean an alkyl residue and $R'$ respectively a lower alkyl residue and x stands for a whole number from 1 to 3. In the silane (III), one of the substituents $R^3$ may be an alkyl residue comprising 1 to 18 carbon atoms and the substituents $R'$ may be lower alkyl residues comprising preferably 1 to 4 carbon atoms.

The substituent $R^1$ of the silane (I) may be a glycidyloxy-functional residue and the sol may comprise an epoxy resin hardener. The substituent $R^1$ of the silane (I) may be a glycidyloxy-functional residue and the surface of the substrate may be primed with a mercapto-functional silane prior to the application of the sol. The sol may comprise a finely-particled inorganic filler. The sol may comprise a condensation catalyst. The sol may be applied in amounts and may have a solids content such that the cured coating has a thickness of 1 to 10 μm.

The advantages described were accomplished by wiper blades made from rubber, coated according to the method above. Among the elastomeric substrates that can be successfully coated according to the invention is rubber, in particular, that is the elastic product that can be obtained in a known manner by vulcanizing natural rubber, polychloroprene, etc. with relatively small amounts of sulfur. It may be used directly for the method according to the invention or it may have been subject to one of the surface treatments that were mentioned, e. g., chlorination.

Like the materials described by Nass et al., the cured coatings produced according to the method of the invention are inorganic-organic composites, i. e. orcomers, but they do not have the above-described drawbacks of the orcomers. During the first stage of the method according to the invention, a sol is made from a silane. The silane is an alkoxysilane and corresponds to the formula $R^1Si(OR')_3$ (I), wherein $R^1$ is understood to mean a glycidyloxy-functional or a mercapto-functional residue and R' a lower alkyl residue, preferably comprising 1 to 4 carbon atoms, and specifically a methyl residue. Usually, the glycidyloxy-functional residues $R^1$ are glycidyloxy-substituted alkyl residues comprising 1 to 8 carbon atoms. The preferred silane with glycidyloxy-functional residue $R^1$ is the 3-glycidyloxypropyl-1-trimethoxysilane (GPTS). Usually, mercapto-functional residues $R^1$ are mercaptoalkyl residues comprising 2 to 8 carbon atoms. The preferred mercaptoalkyl residue is the 3-mercaptopropyl residue, the preferred silane with mercapto-functional residue $R^1$ is the 3-mercaptopropyl-1-trimethoxysilane.

The first step of the conversion of the silanes (I) to a sol is a hydrolysis reaction, wherein from the alkoxy residues hydroxyl groups are produced which, in turn, are capable of condensation reactions—with other hydroxyl groups with delivery of water, with alkoxy groups with delivery of alcohol. The condensation reactions result in the formation of siloxane structures. During this process, hydrolysis and condensation take place side-by-side. The condensation, however, is only completed during the subsequent curing of the sol to form a gel by forming a highly cross-linked siloxane structure. For the hydrolysis, a suitably diluted aqueous acid is used such as 0.1 n hydrochloric acid. If for glycidyloxy-functional silanes the stoichiometric amount of water (3 mol water/mol silane) or even an excess is used for the hydrolysis, a portion of the epoxy rings is opened in an acid-catalyzed manner toward the diol and is thus lost for the polyaddition during the subsequent curing, which results in a loss of elastic properties. Therefore, it is recommended to work with a lesser stoichiometric amount, for example, with half of the stoichiometric amount. Then, the condensation takes place primarily between hydroxyl groups and alkoxy groups while forming alcohol, and the hydrolysis of the epoxy ring is pushed back.

The sol reaction can be carried out without solvent or diluent. The addition of an inert solvent or diluent may be advisable if the silane (I) or, as is explained below, the mixture of the silane (I) and the silanes (II) and/or (III) as well as optionally further additives is so viscous at the selected reaction temperatures—generally room temperature or slightly elevated or reduced temperatures such as −10° to +60° C.—that the mixing-in of the water for the hydrolysis is facilitated by the solvent or diluent. The alcohol R'OH, which corresponds to the alkoxy residues of the silane (I), is particularly suited as solvent or diluent. However, solvent and diluent should only be used in amounts such that the sol results in a coating having the desired thickness once it has been applied to the substrate and after the solvent and diluent has evaporated.

The sol reaction takes place relatively quickly; usually it is completed after 15 minutes to 5 hours.

The incorporation of a silane of the formula $R^2_xSi(OR')_{4-x}$ (II) promotes the wettability of the substrates by the sol and therewith the formation of cohesive, plane layers on the substrate. This effect is probably associated with the hydrophobic character of the substituent or the substituents $R^2$. Because, in the formula, $R^2$ is respectively understood to mean a halogenated higher alkyl residue or a lower alkyl residue, but with at least one substituent $R^2$ being a halogenated, particularly a fluorinated higher alkyl residue. R' identifies a lower alkyl residue and x stands for a whole number from 1 to 3. The silane (II) is incorporated into the siloxane structure of the sol because of its alkoxy group(s) and improves the wetting of the hydrophobic surface of the substrate through its/their hydrophobic substituent $R^2$. Those silanes (II) are particularly suitable that include a halogenated, in particular, fluorinated alkyl residue comprising 5 to 18 carbon atoms, in which residue at least 50% of the hydrogen atoms are replaced by fluorine and which silanes comprise 4−x alkoxy residues comprising preferably 1 to 4 carbon atoms, in particular methyl residues. Of the suitable silanes (II), the following should be mentioned by way of example, tridecafluoro-1,1,2,2-tetrahydro-octyl-1-triethoxysilane, tridecafluoro-1,1,2,2-tetrahydro-octyl-1-methyl-dimethoxysilane, and heptadecafluoro-1,1,2,2-tetrahydrodecyl-1-triethoxysilane. Advisably, the silane (II) is added in amounts from 0.1 to 10 mol %, particularly from 0.5 to 2 mol % in relation to the silane (I).

Another base material which is selectively incorporated during the production of the sol is a silane of the formula $R^3_xSi(OR')_{4-x}$ (III) which further reduces the frictional resistance, especially when mercapto-functional silanes (I) are used. In the formula, $R^3$ is respectively understood to mean an alkyl residue, preferably comprising 1 to 18 carbon atoms, R' identifies a lower alkyl residue, preferably comprising 1 to 4 carbon atoms, and particularly the methyl residue, and x stands for a whole number from 1 to 3. Optionally, the silane (III) is used in amounts generally ranging from 5 to 40 mol %, particularly from 10 to 20 mol %, and is incorporated into the siloxane skeleton of the sol because of its alkoxy group(s).

If the silane (I) is glycidyloxy-functional, the sol may further include an epoxy resin hardener. Suitable hardeners are, in particular, aromatic polyhydroxy compounds, e. g., bivalent phenols such as bisphenol A. During the subsequent curing of the sol, the epoxy resin hardener contributes to the further cross-linking of the siloxane skeleton. Advisably, it is added in lesser stoichiometric amounts related to the silane (I), e. g., up to 0.4 mol bisphenol A per mol silane (I).

The sol may also comprise reinforcing, fine-particled inorganic materials, e.g., boehmite with particle sizes in the nanometer range. With amounts of 1 to 20 wt. % related to the silane (I), a network of high stability enriched by inorganic material is obtained which still has sufficient elasticity.

Tertiary amines having an aromatic structure have proven especially useful as condensation catalysts which promote the curing of the sol to form a gel. Suitable amines of this type are, for example, imidazole, 1-methylimidazole and, albeit less effective, pyridine and the isomeric methylpyridines. Advisably, these catalysts are added in amounts from 0.1 to 15, particularly 2 to 10 mol % related to the silane (I) and optionally to the silanes (II) and (III).

For the production of the sol, the silane (I) can be provided and the water required for the hydrolysis can be added little by little at room temperature while stirring, advisably in the form of diluted mineral acid. Then, optionally the fine-particled, inorganic material, the epoxy resin hardener, the condensation catalyst as well as the silanes (II) and (III) are added at the same time or in any desired sequence, and the latter are hydrolyzed.

Optionally by means of an inert solvent or diluent, the sol is diluted to a solids content which corresponds to the desired layer thickness of the cured coating produced from the sol. This thickness is usually between 1 and 10 μm. For a given system, the correlation between the solvent or diluent content of a sol and the layer thickness can be determined easily by way of preliminary tests. The sol is applied to the substrates according to conventional methods. As mentioned above, these substrates may have been subjected to a chemical surface treatment and it is advisable to surface-clean them prior to coating with a solvent such as ethanol, isopropanol or acetone, and the substrates are blasted with oil-free air. It is particularly recommended to prime the substrates after the cleaning and prior to the coating with the sol by treating them with a mercapto-functional silane, for example, a mercapto-functional silane (I), if the silane (I) used for the production of the sol is a glycidyloxy-functional silane. The mercapto-functional silane helps the gel formed during the curing of the sol to adhere to the substrate. Suitable coating processes are, e. g., dip coating or centrifugal coating (spin-coating). It is, of course, possible to apply the sol to only portions of an object, for example, the lips of wiper blades.

The solvent or diluent is evaporated from the applied sol, and the sol is cured to form a gel. Both can take place in an air flow at an elevated temperature of, for example, 50° to 120° C. Curing normally takes 10 minutes to 20 hours, advantageously 1 to 10 hours, with the coatings made of glycidyloxy-functional silanes (I) curing faster than those made from mercapto-functional silanes (I).

BRIEF DESCRIPTION OF THE DRAWINGS

The Figure illustrates a plan view of an apparatus that was used to determine the coefficients of friction in the examples below:

A circular glass plate 1 is made to rotate by a motor.

On the one end of the arm 2 there is a holder for a segment 3 of a wiper blade having a length of 5 cm, the other end dips into an oil bath 4 to dampen the oscillations. The pivotal point of the arm is seated on a cross rib 2a so as to rotate freely and operates a wire strain gauge 5. The arm 2 is weighted down by the weight 6 such that the wiper blade segment 3 acts on the glass plate with a force of 16 N/cm. The arm 2 is deflected horizontally by the frictional resistance between the rotating glass and the wiper blade segment 3 and is pressed against the wire strain gauge 5. This generates an electrical signal whose intensity is read on a scale after amplification. This is the unit-less friction coefficient $\mu^T$ (measured under dry conditions). It represents a characteristic quantity for the coating of the wiper blade segment 3 for a specific sliding speed at a specific downward-bearing force. The sliding speed of the glass plate 1 at the center support point of the wiper blade segment 3 is adjusted to 20 cm/sec. The measurements were taken at room temperature, and the values were read respectively after a waiting time of 1 min. After every 5 measurements, the surface of the glass plate 1 was cleaned with the aqueous solution of a commercially available detergent, washed off with demineralized water, rubbed dry and blasted with oil-free air. Before the measurement, the wiper blade segments 3 were cleaned with isopropanol and blasted with oil-free pressurized air. For the determination of the wet friction coefficients $\mu^N$, a little water was applied to the plate.

DESCRIPTION OF THE PREFERRED EMBODIMENTS

Rubber was used as a substrate made of vulcanized natural rubber, chlorinated vulcanized natural rubber, vulcanized chloroprene rubber and chlorinated chloroprene rubber. The chlorination was carried out by treatment with chlorine water in the usual manner.

The abbreviations used in the examples have the following meaning:

| | |
|---|---|
| NKu | vulcanized natural rubber, non-chlorinated |
| CKu | vulcanized chloroprene rubber (neoprene), non-chlorinated |
| NKc | vulcanized natural rubber, chlorinated |
| CKc | vulcanized chloroprene rubber (neoprene), chlorinated |
| GPTS | 3-glycidyloxypropyl-1-trimethoxysilane |
| BPA | bisphenol A |
| FTS | tridecafluoro-1,1,2,2-tetrahydrooctyl-1-triethoxysilane |
| MI | 1-methylimidazole |
| MTMO | 3-mercaptopropyl-1-trimethoxysilane |
| MTES | methyltriethoxysilane |
| PTMS | propyltrimethoxysilane |
| OTMS | n-octyltrimethoxysilane |
| ODTMS | octadecyltrimethoxysilane |

Example 1—Sol from GPTS/BPA/FTS/MI 9.44 g of GPTS (0.04 mol) were placed into a 40 ml snap cover jar and 1.08 g of 0.1 n hydrochloric acid (0.06 mol) were added drop by drop while stirring. The mixture, which became clear after 45 sec., was left to be stirred at room temperature for 12 h. Then 3.65 g (0.016 mol) of solid BPA were added. After dissolution of the solid material, 0.16 g of MI (2 mmol) as well as 0.20 g of FTS (0.04 mmol) were added and stirring continued for another hour. The resulting sol was diluted with 8 g of 2-isopropoxyethanol.

Example 2—Sol from GPTS /FTS/MI

The production followed the specification of example 1, but the step of adding BPA was omitted.

Example 3—Sol from GPTS/BPA/boehmite/MI 9.44 g of GPTS (0.04 mol) were placed into a 40 ml snap cover jar and 3.24 g of 0.1 n hydrochloric acid (0.18 mol) were added drop by drop while stirring. The mixture, which became clear after 45 sec., was stirred at room temperature for 12 h. Then 1.32 g (corresponding to 11 wt. %); 1.00 g (corresponding to 8 wt. %) or 0.50 g (corresponding to 4 wt. %) of boehmite were added having an average particle size of 15 nm. The mixture was left to be stirred for 24 h, then 3.65 g of solid BPA (0.016 mol), 0.16 g of MI (2.0 mmol) and 14 g of 1-isopropoxyethanol were added and stirring continued for another hour. The clear sols were then filtered through a membranous filter (pore size 1.3 μm).

Example 4—Sol from MTMO/MI 7.84 g of MTMO (0.04 mol) were placed into a 40 ml snap cover jar and 1.08 g of 0.1 n hydrochloric acid (0.06 mol) were added drop by drop while stirring. The mixture, which became clear after approximately 1 min., was left to be stirred at room temperature for 12 h. Then 0.16 g of MI (2.0 mmol) were added. The mixture was stirred for another hour and then diluted with 4 g of 2-isopropoxyethanol.

Example 5—Sol from MTMO/FTS/MI 7.84 g of MTMO (0.04 mol) were placed into a 40 ml snap cover jar and 1.08 g of 0.1 n hydrochloric acid (0.06 mol) were added drop by drop while stirring. The mixture, which became clear after approx. 1 min., was left to be stirred at room temperature for 10 min. Then 0.20 g of FTS (0.04 mmol; 1 mol %), 0.40 g of FTS (0.08 mmol; 2 mol %), 0.60 g of FTS (0.12 mmol; 3 mol %) or 0.80 g of FTS (0.16 mmol; 4 mol %) were added and the mixture was stirred at room temperature for 12 h. Then 0.16 g of MI (2.0 mmol) were added. The mixture was stirred for another hour and then diluted with 4 g of 2-isopropoxyethanol.

Example 6—Sol from MTMO/boehmite 7.84 g of MTMO (0.04 mol) were placed into a 40 ml snap cover jar and 3.24 g of 0.1 n hydrochloric acid (0.18 mol)

were added drop by drop while stirring. The mixture, which became clear after 45 sec., was left to be stirred at room temperature for 10 min. Then 1.32 g, 1.00 g or 0.50 g of boehmite (corresponding to mol ratios MTMO/boehmite of 1:0.55, 1:0.4 and 1:0.2, respectively) having a mean particle size of 15 nm were added. The mixture was left to be stirred for 24 h and was diluted by adding 5 g of 1-isopropoxyethanol. The sols were then filtered through a membranous filter (pore size 1.2 μm).

Example 7—Sols from MTMO/MI and MTES, PTMS, OTMS or ODTMS 6.27 g of MTMO (0.032 mol) and respectively 0.008 mol of MTES, PTMS, OTMS or ODTMS were placed into a 40 ml snap cover jar and 1.08 g of 0.1 n hydrochloric acid (0.06 mol) were added drop by drop while stirring. After the mixture had become clear, 4 g of ethanol (for MTES and PTMS) or a mixture of 3 g of toluene and 1.5 g of ethanol (for OTMS and ODTMS) were added and the mixture was stirred for another 24 h. The toluene was added to prevent solubility problems.

Coating of substrates and curing of the sols to form gels

Wiper blades made from different types of rubber were coated. They were wiped off with a lint-free wiping paper soaked in ethanol, isopropanol or acetone and they were then blasted with oil-free pressurized air. All substrates were primed by being dipped into a freshly prepared 10 wt. % solution of MTMO in ethanol, the solution was allowed to drip off briefly after pull-out and the substrate was then allowed to dry for 1 h at 90° C.

The wiper blades from which the segments for the determination of the friction coefficients were cut were dipped with their wiper lips into the diluted sols according to the examples 1 to 7 and, after pull-out, they were allowed to drip off briefly at a constant speed. The solvent and diluent was evaporated and the sols were hardened to form gels by heating the wiper blades in a circulating air oven to 90° C. The curing time amounted to 4 h for the GPTS-based sols and to 8 h for the MTMO-based sols. The sols that are described here were diluted such that coatings of a thickness of approx. 5 μm were obtained.

The measured friction coefficients can be taken from the table that follows.

TABLE

Friction coefficients of different coatings

| Coating made from | Example | Friction coefficient $\mu^T/\mu^N$ | Substrate NKu | CKu | NKc | CKc |
|---|---|---|---|---|---|---|
| Uncoated | — | $\mu^T$ | 5.6 | 5.5 | 2.5 | 3.4 |
| Uncoated | — | $\mu^N$ | 1.15 | 1.15 | 0.85 | 0.90 |
| GPTS/BPA/MI with | | | | | | |
| 0.5 Mol % FTS | 1 | $\mu^T$ | 2.2 | — | 1.5 | — |
| 0.5 Mol % FTS | 1 | $\mu^N$ | 0.65 | — | 0.75 | — |
| 1.0 Mol % FTS | 1 | $\mu^T$ | 2.1 | — | 1.8 | — |
| 1.0 Mol % FTS | 1 | $\mu^N$ | 0.55 | — | 0.70 | — |
| 1.5 Mol % FTS | 1 | $\mu^T$ | 2.0 | — | 1.3 | — |
| 1.5 Mol % FTS | 1 | $\mu^N$ | 0.60 | — | 0.70 | — |
| 2.0 Mol % FTS | 1 | $\mu^T$ | 2.4 | — | 1.5 | — |
| 2.0 Mol % FTS | 1 | $\mu^N$ | 0.65 | — | 0.65 | — |
| 3.0 Mol % FTS | 1 | $\mu^T$ | 2.8 | — | 1.3 | — |
| 3.0 Mol % FTS | 1 | $\mu^N$ | 0.50 | — | 0.65 | — |
| GPTS/FTS/MI | 2 | $\mu^T$ | 3.3 | 3.0 | 1.6 | 1.1* |
| GPTS/BPA/MI with | | | | | | |
| 11% boehmite | 3 | $\mu^T$ | 2.9 | 2.3 | 2.6 | 1.6 |
| 8% boehmite | 3 | $\mu^T$ | 3.0 | 2.5 | 3.6 | 2.3 |
| 4% boehmite | 3 | $\mu^T$ | 2.5 | 2.5 | 2.4 | 2.0 |
| MTMO/MI with | | | | | | |
| 0 Mol % FTS | 4 | $\mu^T$ | 2.3 | — | 3.0 | — |
| 0 Mol % FTS | 4 | $\mu^N$ | 0.70 | — | 0.90 | — |
| 1 Mol % FTS | 5 | $\mu^T$ | 1.8 | — | 2.1 | — |
| 1 Mol % FTS | 5 | $\mu^N$ | 0.55 | — | 0.65 | — |
| 2 Mol % FTS | 5 | $\mu^T$ | 1.8 | — | 1.9 | — |
| 2 Mol % FTS | 5 | $\mu^N$ | 0.60 | — | 0.50 | — |
| 3 Mol % FTS | 5 | $\mu^T$ | 1.6 | — | 2.0 | — |
| 3 Mol % FTS | 5 | $\mu^N$ | 0.60 | — | 0.60 | — |
| 4 Mol % FTS | 5 | $\mu^T$ | 2.0 | — | 2.4 | — |
| 4 Mol % FTS | 5 | $\mu^N$ | 0.55 | — | 0.60 | — |
| MTMO/boehmite with Mol ratio MTMO:boehmite | | | | | | |
| 1:0.55 | 6 | $\mu^T$ | 3.1 | — | 3.2 | — |
| 1:0.4 | 6 | $\mu^T$ | 4.0 | — | 2.4 | — |
| 1:0.2 | 6 | $\mu^T$ | 3.2 | — | 2.6 | — |
| MTMO/MI with 20 Mol % | | | | | | |
| MTES | 7 | $\mu^T$ | 3.2 | — | — | — |
| MTES | 7 | $\mu^N$ | 0.70 | — | — | — |
| PTMS | 7 | $\mu^T$ | 3.30 | — | — | — |
| PTMS | 7 | $\mu^N$ | 0.60 | — | — | — |
| OTMS | 7 | $\mu^T$ | 3.40 | — | — | — |
| OTMS | 7 | $\mu^N$ | 0.60 | — | — | — |
| ODTMS | 7 | $\mu^T$ | 3.2 | — | — | — |
| ODTMS | 7 | $\mu^N$ | 0.60 | — | — | — |

*This value is probably too low because the coating was slightly wavy.

A comparison of the dry friction coefficients for the coated wiper blades with that of the uncoated wiper blades shows clearly lower values for the coated wiper blades. An exception is the GPTS/BPA/MI/boehmite-system on chlorinated rubber made from natural rubber (NKc), in which system the friction coefficients are not improved. The wet friction coefficients of the coated wiper blades are lower throughout than those of the comparable uncoated wiper blades.

What is claimed is:

1. A method of producing a layer which is friction-reducing on an elastomeric substrate, the method comprising the steps of:
   a. providing an elastomeric substrate;
   b. forming a sol by hydrolysis and condensation of at least one silane having a formula:

$$R^1Si(OR')_3 \tag{I}$$

where $R^1$ is one of a glycidyloxy-functional residue or a mercapto-functional residue and R' is a residue of a lower alkyl group having 1–4 carbon atoms;
   c. coating the elastomeric substrate with the sol to form a coating; and
   d. curing the coating to form a gel.

2. The method according to claim 1, wherein the sol is formed in step (b) by hydrolysis and condensation of a mixture of the at least one silane having a formula (I) and at least one silane having a formula:

$$R^2_xSi(OR')_{4-x} \tag{II}$$

where $R^2$ is one of a residue of a halogenated higher alkyl group having 5 or more carbon atoms or a residue of a lower alkyl group having 1–4 carbon atoms, with the proviso that at least one of the residues $R^2$ is a residue of a halogenated higher alkyl group having 5 or more carbon atoms, R' identifies a residue of a lower alkyl group having 1–4 carbon atoms, and x stands for a whole number ranging from 1 to 3.

3. The method according to claim 2, wherein, in the at least one silane having a formula (II), one of the substituents $R^2$ is a highly fluorinated alkyl residue having 5–18 carbon atoms where at least 50% of the hydrogen atoms are replaced by fluorine atoms.

4. The method according to claim 2, wherein the sol is formed in step (b) by hydrolysis and condensation of a mixture of the at least one silane having a formula (I), the at least one silane having a formula (II), and at least one silane having a formula:

$$R^3_x Si(OR')_{4-x} \quad \text{(III)}$$

where $R^3$ is an alkyl residue and R' is a residue of a lower alkyl group having 1–4 carbon atoms, and x stands for a whole number ranging from 1 to 3.

5. The method according to claim 4, wherein, in the at least one silane having a formula (III), one of the substituents $R^3$ is a residue of an alkyl group having 1–18 carbon atoms.

6. The method according to claim 1, wherein the sol is formed in step (b) by hydrolysis and condensation of a mixture of the at least one silane having a formula (I) and at least one silane having a formula:

$$R^3_x Si(OR')_{4-x} \quad \text{(III)}$$

where $R^3$ is an alkyl residue and R' is a residue of a lower alkyl group having 1–4 carbon atoms, and x stands for a whole number ranging from 1 to 3.

7. The method according to claim 6, wherein, in the at least one silane having a formula (II), one of the substituents $R^3$ is a residue of an alkyl group having 1–18 carbon atoms.

8. The method according to claim 1, wherein the substituent $R^1$ of the silane (I) is a glycidyloxy-functional residue and the sol comprises an epoxy resin hardener.

9. The method according to claim 1, wherein the substituent $R^1$ of the silane (I) is a glycidyloxy-functional residue and wherein the method further comprises priming the surface of the elastomeric substrate with a mercapto-functional silane prior to coating the sol in step (c).

10. The method according to claim 1, wherein the sol comprises a particulate inorganic material.

11. The method according to claim 1, wherein the sol comprises a condensation catalyst.

12. The method according to claim 1, wherein the sol is coated in an amount effective to provide a gel in step (d) having a thickness ranging from 1 to 10 μm.

13. A wiper blade, comprising:
an elastomeric substrate comprised of rubber; and
a layer comprised of a gel provided on the elastomeric substrate according to the method of claim 1.

14. The method according to claim 2, wherein the residue of a halogenated higher alkyl group having 5 or more carbon atoms has 5–18 carbon atoms.

15. The method according to claim 10, wherein the particulate inorganic material has an average particle size of 15 nanometer.

* * * * *